US009225215B2

(12) United States Patent
Asano

(10) Patent No.: US 9,225,215 B2
(45) Date of Patent: Dec. 29, 2015

(54) ROTATING ELECTRIC MACHINE

(71) Applicant: DENSO CORPORATION, Kariya, Aichi-pref. (JP)

(72) Inventor: Nobuhiro Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 234 days.

(21) Appl. No.: 13/908,443

(22) Filed: Jun. 3, 2013

(65) Prior Publication Data

US 2014/0035400 A1 Feb. 6, 2014

(30) Foreign Application Priority Data

Jul. 31, 2012 (JP) .................................. 2012-169476
Mar. 1, 2013 (JP) .................................. 2013-040648

(51) Int. Cl.
*H02K 3/28* (2006.01)
*H02K 3/04* (2006.01)
*H02K 3/12* (2006.01)
*H02K 5/24* (2006.01)

(52) U.S. Cl.
CPC .. *H02K 3/28* (2013.01); *H02K 3/04* (2013.01); *H02K 3/12* (2013.01); *H02K 5/24* (2013.01)

(58) Field of Classification Search
CPC ............. H02K 3/04; H02K 3/12; H02K 3/28; H02K 5/24
See application file for complete search history.

(56) References Cited

U.S. PATENT DOCUMENTS 5,686,774 A * 11/1997 Slavik et al. .................. 310/198
6,784,583 B2 8/2004 Umeda
8,008,828 B2 * 8/2011 Koike ........................... 310/198
2004/0145257 A1 * 7/2004 Oohashi ......................... 310/71
2005/0017592 A1 * 1/2005 Fukushima .................... 310/179
2006/0103255 A1 5/2006 Seguchi et al.
2009/0072652 A1 3/2009 Koike
2011/0012471 A1 * 1/2011 Dang et al. .................... 310/201

FOREIGN PATENT DOCUMENTS

| JP | A-2000-209802 | 7/2000 |
| JP | A-2002-247787 | 8/2002 |
| JP | A-2004-229460 | 8/2004 |
| JP | A-2005-45962 | 2/2005 |
| JP | B2-3633494 | 3/2005 |
| JP | A-2006-149049 | 6/2006 |
| JP | A-2009-72008 | 4/2009 |

OTHER PUBLICATIONS

Office Action issued in Japanese Application No. 2013-040648 issued Jul. 8, 2014 (with translation).

* cited by examiner

*Primary Examiner* — Dang Le
(74) *Attorney, Agent, or Firm* — Oliff PLC

(57) ABSTRACT

A rotating electric machine includes a hollow cylindrical stator core and a stator coil mounted on the stator core. The stator core has a plurality of slots that are arranged in a circumferential direction of the stator core. The stator coil is formed of a plurality of substantially U-shaped electric conductor segments to include at least one Δ-Y connection. The Δ-Y connection includes a Δ-connected first three-phase winding and a Y-connected second three-phase winding. The first three-phase winding includes three phase windings that are Δ-connected to define three terminals of the first three-phase winding therebetween. The second three-phase winding includes three phase windings that are respectively connected to the three terminals of the first three-phase winding. Further, the number of turns of the first three-phase winding and the number of turns of the second three-phase winding are respectively set to two different odd numbers.

12 Claims, 11 Drawing Sheets

| THE NUMBER OF TURNS | | | THE NUMBER OF TURNS OF |
|---|---|---|---|
| Δ | Y | TOTAL | EQUIVALANT Y CONNECTION |
| 1 | 7 | 8 | 7.58 |
| 3 | 5 | 8 | 6.73 |
| 5 | 3 | 8 | 5.89 |
| 7 | 1 | 8 | 5.04 |

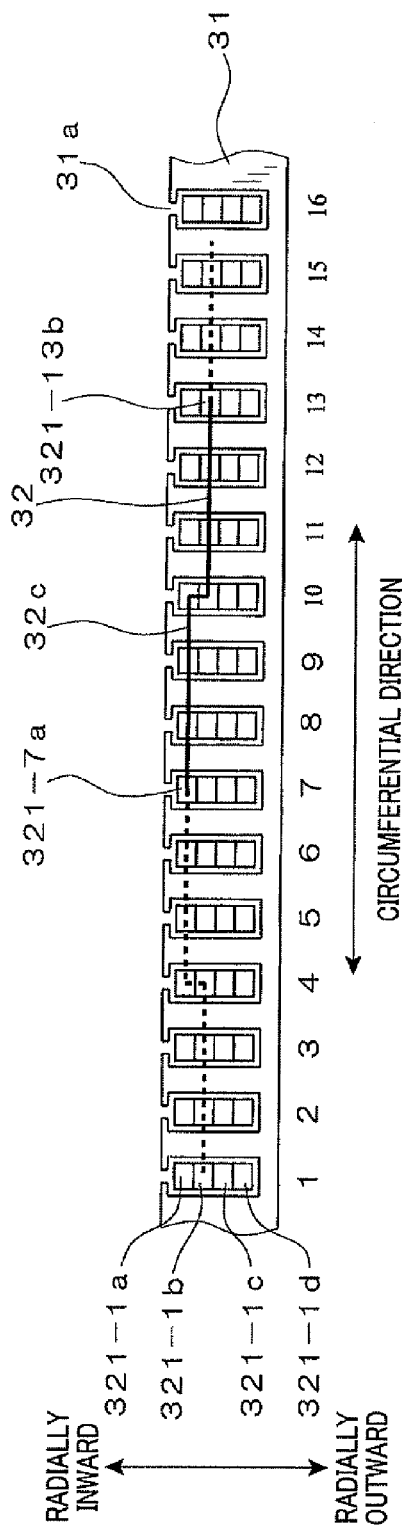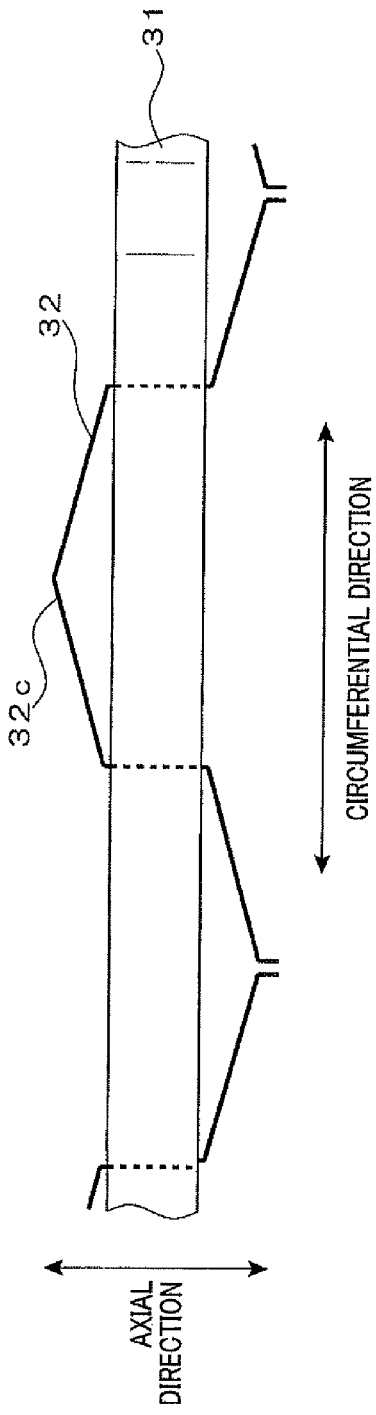

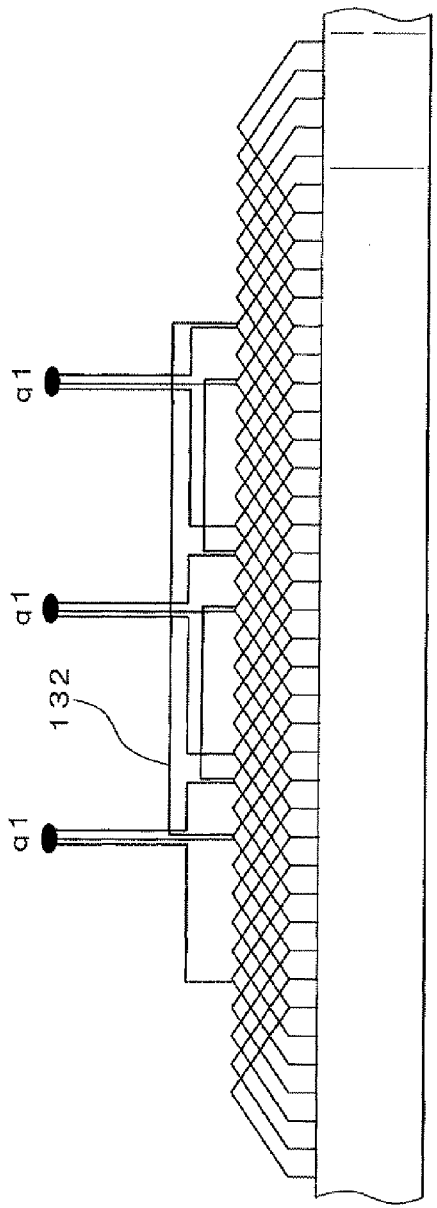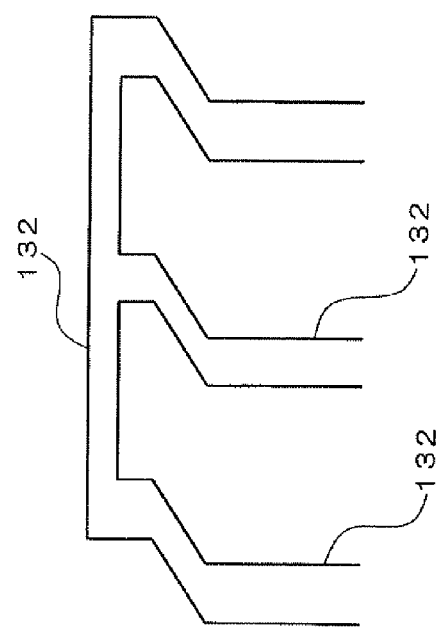

| THE NUMBER OF TURNS | | | THE NUMBER OF TURNS OF EQUIVALANT Y CONNECTION |
|---|---|---|---|
| Δ | Y | TOTAL | |
| 1 | 3 | 4 | 3.58 |
| 3 | 1 | 4 | 2.73 |

| THE NUMBER OF TURNS | | | THE NUMBER OF TURNS OF EQUIVALANT Y CONNECTION |
|---|---|---|---|
| Δ | Y | TOTAL | |
| 1 | 7 | 8 | 7.58 |
| 3 | 5 | 8 | 6.73 |
| 5 | 3 | 8 | 5.89 |
| 7 | 1 | 8 | 5.04 |

ROTATING ELECTRIC MACHINE

CROSS-REFERENCE TO RELATED APPLICATIONS

This application is based on and claims priority from Japanese Patent Applications No. 2012-169476 filed on Jul. 31, 2012 and No. 2013-40648 filed on Mar. 1, 2013, the contents of which are hereby incorporated by reference in their entireties into this application.

BACKGROUND

1 Technical Field

The present invention relates to rotating electric machines that are used in, for example, motor vehicles as electric motors and electric generators.

2 Description of Related Art

There is known, for example from Japanese Patent No. 3633494, an automotive alternator which includes a stator coil that is formed by connecting a plurality of electric conductor segments so as to include a pair of Δ-Y connections; each of the Δ-Y connections is a combination of a Δ-connected three-phase winding and a Y-connected three-phase winding. The alternator also includes a hollow cylindrical stator core which has a plurality of slots that are formed in a radially inner surface of the stator core so as to be equally spaced from one another in the circumferential direction of the stator core. Further, each of the Δ-connected and Y-connected three-phase windings includes a plurality of in-slot portions each of which is received in a corresponding one of the slots of the stator core. Furthermore, the number of the in-slot portions of the Δ-connected three-phase winding and the number of the in-slot portions of the Y-connected three-phase winding in the same slot of the stator core are equal (more specifically, both the numbers are equal to 2). That is, the ratio of number of turns between the Δ-connected and Y-connected three-phase windings is equal to 1:1.

However, with the above configuration, when both the number of turns of the Δ-connected three-phase winding and the number of turns of the Y-connected three-phase winding are equal to N/2, the number of turns of an equivalent Y connection that is equivalent to (or converted from) the Δ-Y connection is only limited to $(1/2+\sqrt{3}/6)N$. For example, with N being equal to 4, the number of turns of the equivalent Y connection is only limited to approximately 3.15.

Moreover, to increase the output of the alternator in a high-speed operating region and improve the efficiency of the alternator, it is necessary to reduce the total number of turns of the stator coil. Further, the total number of turns of the stator coil may be reduced by, for example, the following methods: (1) reducing the number of the in-slot portions of the stator coil in each of the slots of the stator core; (2) employing only Δ connections to replace the Δ-Y connections; and (3) dividing each of the Δ-Y connections into a plurality of Δ-Y sub-connections that are connected in parallel with each other. In contrast, to increase the output of the alternator in a low-speed operating region, it is necessary to increase the total number of turns of the stator coil. Further, the total number of turns of the stator coil may be increased by, for example, the following methods: (4) increasing the number of the in-slot portions of the stator coil in each of the slots of the stator core; and (5) employing only Y connections to replace the Δ-Y connections.

However, the above methods involve the following problems.

In the case of changing the number of the in-slot portions of the stator coil in each of the slots of the stator core (i.e., using the method (1) or the method (4)), it is necessary to change at least one of the dimensions of the stator core and the in-slot portions of the stator coil. That is, it is necessary to change the design of at least one of the stator core and the stator coil. Consequently, the number of part types will be increased, thereby increasing the manufacturing cost.

In the case of employing only Δ connections to replace the Δ-Y connections (i.e., using the method (2)) without changing the number of the in-slot portions of the stator coil in each of the slots of the stator core, the number of turns of an equivalent Y connection that is equivalent to each of the Δ connections is only limited to $(1/\sqrt{3})N$. On the other hand, in the case of employing only Y connections to replace the Δ-Y connections (i.e., using the method (5)) without changing the number of the in-slot portions of the stator coil in each of the slots of the stator core, the number of turns of each of the Y connections is only limited to N. Therefore, in either of these two cases, it is difficult to meet various requirements for outputs of diversified automotive alternators; it is also difficult to increase the degree of freedom in selection of the stator coil specification.

In the case of dividing each of the Δ-Y connections into a plurality of Δ-Y sub-connections that are connected in parallel with each other (i.e., using the method (3)), the number of the in-slot portions of the stator coil to be connected to an electric in power conversion device (e.g., a rectifier or an inverter) will be increased, thus increasing the man-hours required for connecting the in-slot portions of the stator coil to the electric power conversion device. In addition, it is necessary to change the specification of the electric power conversion device, thus increasing the number of part types.

SUMMARY

According to an exemplary embodiment, a rotating electric machine is provided which includes a rotor and a stator. The stator includes a hollow cylindrical stator core and a stator coil mounted on the stator core. The stator core has a plurality of slots that are arranged in the circumferential direction of the stator core. The stator coil is formed of a plurality of substantially U-shaped electric conductor segments to include at least one Δ-Y connection. The Δ-Y connection is comprised of a Δ-connected first three-phase winding and a Y-connected second three-phase winding. The first three-phase winding includes three phase windings that are Δ-connected to define three terminals of the first three-phase winding therebetween. The second three-phase winding includes three phase windings that are respectively connected to the three terminals of the first three-phase winding. Further, the number of turns of the first three-phase winding and the number of turns of the second three-phase winding are respectively set to two different odd numbers.

With the above configuration, it is possible to increase the degree of freedom in selection of the stator coil specification in comparison with the conventional configuration where both the number of turns of the Δ-connected three-phase winding and the number of turns of the Y-connected three-phase winding are set to the same even number. That is, it is possible to increase the is output of the rotating electric machine in a high-speed operating region and improve the efficiency of the rotating electric machine by setting the number of turns of the Δ-connected first three-phase winding to be greater than the number of turns of the Y-connected second three-phase winding. On the other hand, it is also possible to increase the output of the rotating electric machine in a low-speed operating region by setting the number of turns of the first three-phase winding to be less than the number of turns of the second three-phase winding.

Moreover, with the above configuration, it is possible to realize different combinations of the number of turns of the first three-phase winding and the number of turns of the second three-phase winding with the same stator core and electric conductor segments. In addition, it is unnecessary to change the specification of an electric power conversion device (e.g., a rectifier or an inverter) employed for the rotating electric machine only for the purpose of realizing the different combinations of the number of turns of the first three-phase winding and the number of turns of the second three-phase winding.

Accordingly, with the above configuration, it is possible to increase the degree of freedom in selection of the stator coil specification without increasing the cost, the number of part types or the man-hours for manufacturing the rotating electric machine.

Preferably, the first and second three-phase windings are mounted on the stator core so that each of the phase windings of the first three-phase winding is offset from a corresponding one of the phase windings of the second three-phase winding by $\pi/6$ in electrical angle.

Each of the first and second three-phase windings has a plurality of in-slot portions each of which is received in one of the slots of the stator core. The ratio of number of the in-slot portions between the first and second three-phase windings in the same slot of the stator core is preferably set to be equal to the ratio of number of turns between the first and second three-phase windings.

In a further implementation, each of the substantially U-shaped electric conductor segments forming the stator coil includes a pair of in-slot portions, a turn portion and a pair of end portions. The in-slot portions are respectively received in two different slots of the stator core. The turn portion extends, on one axial side of the stator core, to connect the in-slot portions of the electric conductor segment. The end portions extend, on the other axial side of the stator core, respectively from the in-slot portions of the electric conductor segment and are respectively joined to corresponding end portions of another two electric conductor segments. Each of the phase windings of the first and second three-phase windings includes at least one unit winding that is formed by joining the corresponding end portions of a predetermined number of the electric conductor segments so as to extend for one turn around the stator core.

Each pair of the unit windings included in the same one of the phase windings of the first and second three-phase windings may be connected to each other via one connecting electric conductor segment which has a substantially U shape different from that of the electric conductor segments forming the stator coil.

Otherwise, all corresponding pairs and trios of the unit windings forming the phase windings of the first and second three-phase windings may be connected via an assembly which includes a plurality of connecting electric conductor segments that are shaped and assembled together before being mounted to the stator core.

Alternatively, corresponding pairs and trios of the unit windings forming the phase windings of the first and second three-phase windings may be connected via respective lead portions that are drawn from corresponding ones of the slots of the stator core and joined to one another. In this case, it is preferable that the number of the lead portions of the unit windings which are radially aligned with each other is less than the number of the in-slot portions of the electric conductor segments in each of the slots of the stator core.

It is also preferable that all the joints formed between the unit windings are located so as to be out of radial alignment with each other.

Further, all the joints formed between the unit windings may be located on the same axial side of the stator core as the turn portions of the electric conductor segments. It in this case, it is preferable that for each of the electric conductor segments, the turn portion of the electric conductor segment is formed by radially shifting the in-slot portions of the electric conductor segment relative to each other without twisting the electric conductor segment.

It is preferable that each of the electric conductor segments forming the stator coil has a substantially rectangular cross-sectional shape.

It is also preferable that the stator core is formed of magnetic steel sheets that are laminated in the axial direction of the stator core.

Each of the joints formed between the unit windings may be covered with a resin cap.

Alternatively, each of the joints formed between the unit windings may be multi-layer-insulation-coated.

Otherwise, all the joints formed between the unit windings may be covered with a first impregnating material; all the joints formed between the corresponding end portions of the electric conductor segments may be covered with a second impregnating material; all the turn portions of the electric conductor segments may be covered with a third impregnating material. In this case, it is preferable that the viscosities of the first, second and third impregnating materials are different from each other.

The stator coil may include a plurality of $\Delta$-Y connections that have the same configuration and are located on the stator core so as to be offset from one another by $\pi/6$ in electrical angle.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings:

FIGS. 3A and 3B are schematic development views illustrating the arrangement of electric conductor segments, which together form a stator coil of a stator of the alternator, in slots of a stator core of the stator as well as the connection between the electric conductor segments;

FIGS. 5A and 5B are schematic views illustrating a method of connecting each pair of unit windings of the same phase according to a modification;

DESCRIPTION OF EMBODIMENT

Figure 1:
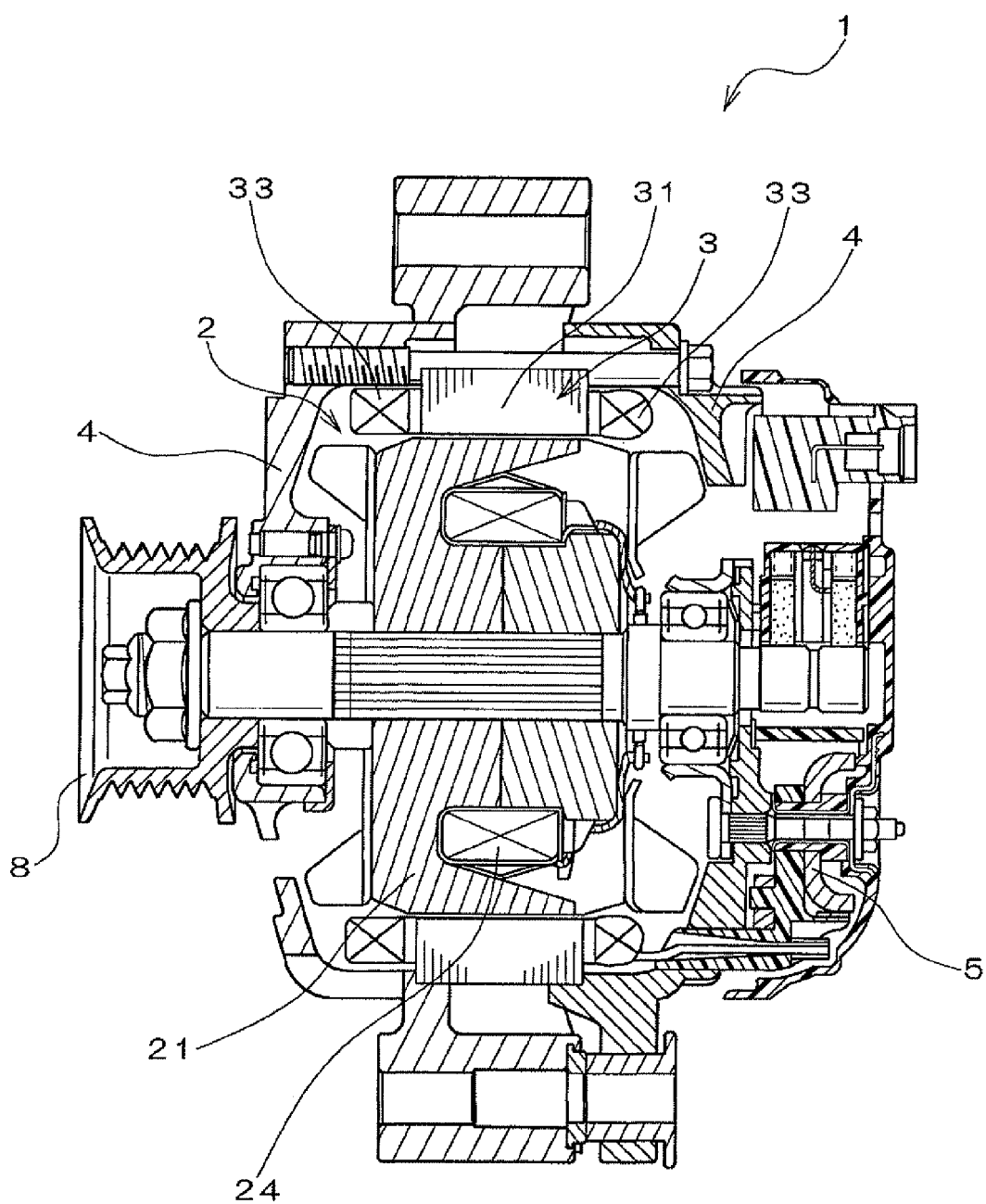
FIG. 1 is a schematic cross-sectional view of an automotive alternator according to an exemplary embodiment.

FIG. 1 shows the overall configuration of a rotating electric machine 1 according to an exemplary embodiment. In this embodiment, the rotating electric machine 1 is configured as an automotive alternator that is for use in a motor vehicle, such as a passenger car or a truck.

As shown in FIG. 1, the alternator 1 includes a rotor 2, a stator 3, a frame 4, a rectifier 5 and a pulley 8.

In operation of the alternator 1, torque is transmitted from an internal combustion engine (not shown) of the vehicle to the pulley 8 via a belt (not shown), thereby causing the rotor 2 to rotate in a predetermined direction. During rotation of the rotor 2, excitation voltage is applied to a field coil 24 of the rotor 2, thereby magnetizing claw portions of a pair of Lundell-type magnetic pole cores 21 of the rotor 2. Consequently, the magnetized claw portions of the magnetic pole cores 21 create a rotating magnetic field, which induces three-phase AC voltage in the stator 3. The three-phase AC voltage is then rectified into DC voltage by the rectifier 5, and the obtained DC voltage is outputted from the alternator 1 via output terminals (not shown) of the rectifier 5.

Next, the configuration of the stator 3 according to the present embodiment will be described in detail.

Referring to FIGS. 1 and 3A-3B, the stator 3 includes a hollow cylindrical stator core 31 and a stator coil 33. The stator core 31 has a plurality of (e.g., 96 in the present embodiment) slots 31a that are formed in the radially inner surface of the stator core 31 so as to be equally spaced from one another in the circumferential direction of the stator core 31. Each of the slots 31a extends in the axial direction of the stator core 31 so as to axially penetrate the stator core 31 in the axial direction. In addition, for each of the slots 31a, the depth-wise direction of the slot 31a coincides with a radial direction of the stator core 31. The stator coil 33 is formed by joining corresponding ends of a plurality of substantially U-shaped electric conductor segments 32; each of the electric conductor segments 32 has a substantially rectangular cross-sectional shape and is mounted on the stator core 31.

With the substantially rectangular cross-sectional shape of the electric conductor segments 32, it is possible to increase the space factors of the stator coil 33 in the slots 31a of the stator core 31 and lower the resistance of the stator coil 33. Consequently, it is possible to secure both high output and high efficiency of the alternator 1.

In addition, in the present embodiment, the stator core 31 is formed by laminating a plurality of magnetic steel sheets in the axial direction of the stator core 31. With this formation, it is possible to lower the iron loss of the stator 3, thereby further improving the efficiency of the alternator 1.

Figure 2:
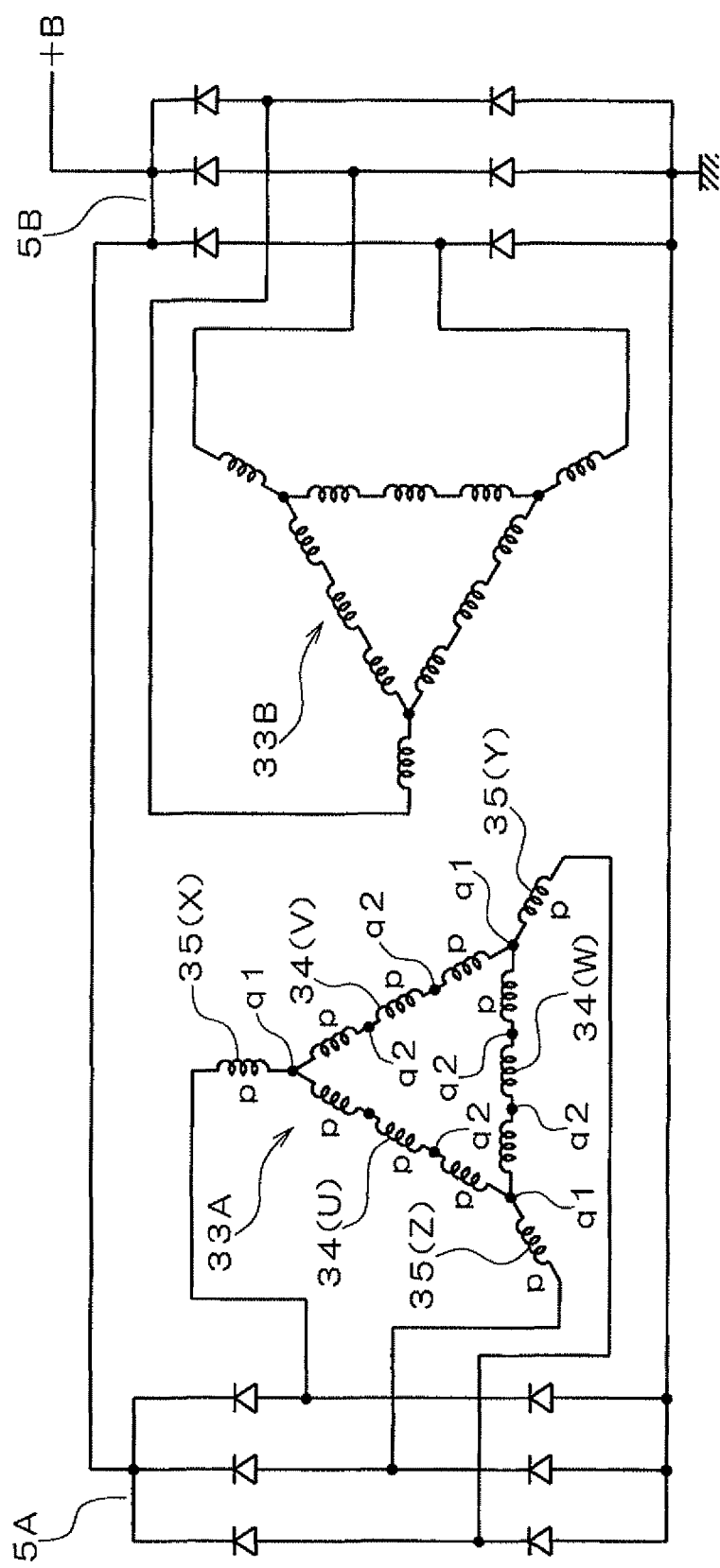
FIG. 2 is a schematic circuit diagram of the automotive alternator.

Referring now to FIG. 2, in the present embodiment, the stator coil 33 is configured to include a pair of Δ-Y connections 33A and 33B. The Δ-Y connections 33A and 33B have the same configuration and are located on the stator core 31 so as to be offset from each other by π/6 in electrical angle (or by one slot 31a of the stator core 31). In addition, the rectifier 5 includes a pair of full-wave rectification circuits 5A and 5B, which respectively full-wave rectify the three-phase AC voltages induced in the Δ-Y connections 33A and 33B of the stator coil 3.

It should be noted that since the Δ-Y connections 33A and 33B have the same configuration, only the Δ-Y connection 33A will be described in detail hereinafter, omitting a detailed description of the Δ-Y connection 33B.

As shown in FIG. 2, the Δ-Y connection 33A is a combination of a Δ-connected first three-phase winding 34 and a Y-connected second three-phase winding 35.

Specifically, the first three-phase winding 34 is formed by Δ-connecting a U—phase winding 34U, a V-phase winding 34V and a W-phase winding 34W. On the other hand, the second three-phase winding 35 is formed by Y-connecting an X-phase winding 35X, a Y-phase winding 35Y and a Z-phase winding 35Z. Further, the first and second three-phase windings 34 and 35 are combined so that each of the X-phase, Y-phase and W-phase windings 35X-35W of the second three-phase winding 35 has one end thereof connected to a corresponding one of the three terminals (or the three nodes between the U-phase, V-phase and W-phase windings 34U-34V) of the first three-phase winding 34 and the other end connected to the full-wave rectification circuit 5A of the rectifier 5. Furthermore, each of the U-phase, V-phase and W-phase windings 34U-34V of the first three-phase winding 34 is offset from a corresponding one of the X-phase, Y-phase and W-phase windings 35X-35W of the second three-phase winding 35 by π/6 in electrical angle; thus, each of the U-phase, V-phase and W-phase currents of the first three-phase winding 34 is different in phase by π/6 from a corresponding one of the X-phase, Y-phase and W-phase currents of the second three-phase winding 35. Consequently, harmonic components of the U-phase, V-phase and W-phase currents of the first three-phase winding 34 can be offset by those of the X-phase, Y-phase and W-phase currents of the second three-phase winding 35, thereby reducing both magnetic vibration and magnetic noise generated in the alternator 1.

Moreover, each of the first and second three-phase windings 34 and 35 includes a plurality of in-slot portions each of which is received in a corresponding one of the slots 31a of the stator core 31. The number of the in-slot portions of the first three-phase winding 34 and the number of the in-slot portions of the second three-phase winding 35 in the same slot 31a of the stator core 31 are respectively set to two different odd numbers, more particularly to 3 and 1 in the present embodiment.

In the present embodiment, each of the first and second three-phase windings 34 and 35 is formed by joining corresponding end portions of a predetermined number of the U-shaped electric conductor segments 32.

Specifically, as shown in FIG. 3A, in the present embodiment, in each of the slots 31a of the stator core 31, there are received four in-slot portions 321 of the electric conductor segments 32 so as to be aligned with each other in the radial direction of the stator core 31 (or in the depth-wise direction of the slot 31a).

In addition, in FIG. 3A, for each of the in-slot portions 321, the suffix to the reference number 321 indicates both the number of the slot 31a in which the in-slot portion 321 is received and the layer at which the in-slot portion 321 is located. For example, "321-1a" denotes the in-slot portion 321 which is received in the No. 1 slot 31a and located at the radially innermost layer "a". As described previously, in the present embodiment, the stator core 31 has a total of 96 slots 31a; thus, the numbers of the slots 31a vary from No. 1 to No. 96. Moreover, in each of the slots 31a of the stator core 31, the in-slot portions 321 of the electric conductor segments 32 are arranged in four layers, i.e., the radially innermost layer "a", the radially outermost layer "d" and the two intermediate layers "b" and "c" between the radially innermost and outermost layers "a" and "b".

The in-slot portions 321 of the U-shaped electric conductor segments 32 received in the slots 31a of the stator core 31 are electrically connected to one another in a predetermined manner, forming the stator coil 33.

For example, as shown in FIGS. 3A and 3B, on one axial side (i.e., the upper side in FIG. 313) of the stator core 31, the in-slot portion 321-7a is connected to the in-slot portion 321-13b via a turn portion 32c; the in-slot portion 321-7a is received in the No. 7 slot 31a and located at the radially innermost layer "a"; the in-slot portion 321-13b is received in the No. 13 slot 31a and located at the radially second innermost layer "b"; the No. 7 and No. 13 slots 31a are positioned away from each other by six slots 31a (or by one magnetic pole pitch). The in-slot portions 321-7a, the in-slot portion 321-13b and the turn portion 32c connecting the two in-slot portions 321-7a and 321-13b are integrally formed of one electric conductor segment 32 that is substantially U-shaped. Further, on the other axial side (i.e., the lower side in FIG. 3B) of the stator core 31, one end portion of the electric conductor segment 32, which extends from the in-slot portion 321-7a and protrudes outside the No. 7 slot 31a, is bent toward the opposite circumferential side of the in-slot portion 321-7a to the turn portion 32c (i.e., leftward in FIG. 3B) and joined to an end portion of another electric conductor segment 32 by welding; the other end portion of the electric conductor segment 32, which extends from the in-slot portion 321-13b and protrudes outside the No. 13 slot 31a, is bent toward the opposite circumferential side of the in-slot portion 321-13b to the turn portion 32c (i.e., rightward in FIG. 3B) and joined to an end portion of yet another electric conductor segment 32 by welding.

That is, in the present embodiment, each of the substantially U-shaped electric conductor segments 32 forming the stator coil 33 is configured to include a pair of in-slot portions 321, a turn portion 32c and a pair of end portions. The in-slot portions 321 are respectively received in two different slots 31a of the stator core 31. The turn portion 32c extends, on the one axial side (i.e., the upper side in FIG. 3B) of the stator core 31, to connect the in-slot portions 321 of the electric conductor segment 32. The end portions extend, on the other axial side (i.e., the lower side in FIG. 3B) of the stator core 31, respectively from the in-slot portions 321 of the electric conductor segment 32 and are respectively joined to corresponding end portions of another two electric conductor segments 32.

Moreover, in the present embodiment, every eight electric conductor segments 32 are serially connected in the above-described manner to form one unit winding p (see FIG. 2) that extends for one turn around the stator core 31. That is, one unit winding P includes 16 in-slot portions 321 of the electric conductor segments 32; the 16 in-slot portions 321 are respectively received in 16 slots 31a of the stator core 31 which are spaced from one another by six slots 31a. In addition, in the present embodiment, one magnetic pole pitch corresponds to six slots 31a of the stator core 31 and each of the six slots 31a has four in-slot portions 321 received therein. Consequently, there are a total of 24 unit windings p formed by the U-shaped electric conductor segments 32.

Referring back to FIG. 2, in the present embodiment, the stator coil 33 includes the Δ-Y connections 33A and 33B which have the same configuration. Accordingly, each of the Δ-Y connections 33A and 33B is comprised of half of the 24 unit windings p (i.e., 12 unit windings p).

For example, for the Δ-Y connection 33A, those three unit windings p which respectively include the in-slot portions 321-7b, 321-7c, 321-7d received in the No. 7 slot 31a are serially connected to together form the U-phase winding 34U of the first three-phase winding 34. On the other hand, that unit winding P which includes the in-slot portion 321-8a received in the No. 8 slot 31a forms by itself the X-phase winding 35X of the second three-phase winding 35.

That is, in the present embodiment, those slots 31a in which are received the in-slot portions 321 of the electric conductor segments 32 forming the first three-phase winding 34 are offset by one slot 31a (i.e., by π/6 in electrical angle) from those slots 31a in which are received the in-slot portions 321 of the electric conductor segments 32 forming the second three-phase winding 35. Consequently, the U-phase, V-phase and W-phase currents of the first three-phase winding 34 are respectively different in phase by π/6 from the X-phase, Y-phase and W-phase currents of the second three-phase winding 35.

Furthermore, in the present embodiment, the ratio of number of the in-slot portions 321 between the first and second three-phase windings 34 and 35 in the same slot 31a of the stator core 31 is set to 3:1. The ratio of number of turns between the first and second three-phase windings 34 and 35 is also set to 3:1. Consequently, with the ratio of number of the in-slot portions 321 set equal to the ratio of number of turns, it is possible to uniform electric currents flowing in the in-slot portions 321 received in different slots 31a of the stator core 31, thereby more effectively reducing both magnetic vibration and magnetic noise generated in the alternator 1.

Figure 4A:
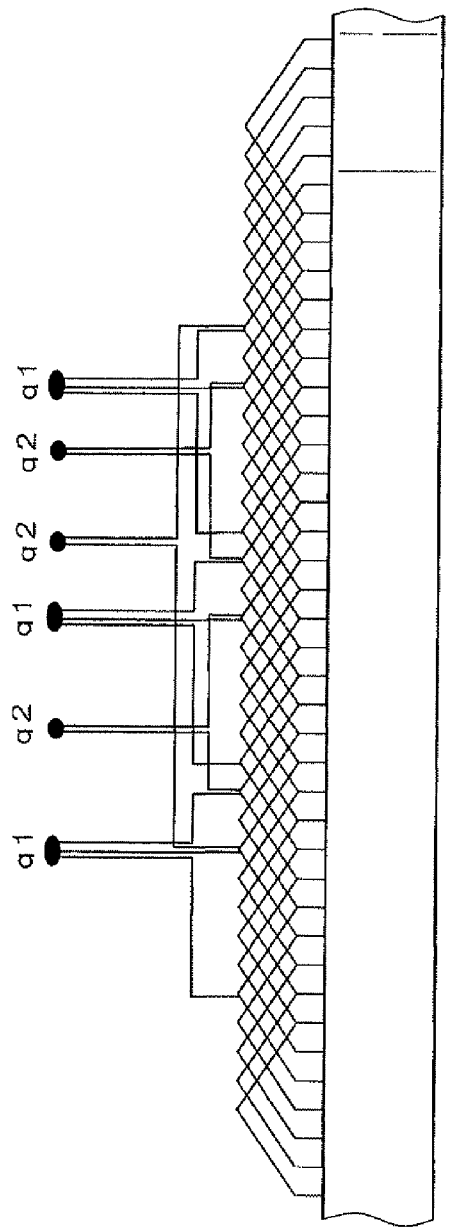
FIG. 4A is a schematic view illustrating both first joints each of which is formed between three unit windings of different phases and second joints each of which is formed between two unit windings of the same phase, all the unit windings together making up the stator coil of the stator.

In the present embodiment, as shown in FIGS. 2 and 4A, the joints between the unit windings p forming the Δ-Y connection 33A include first joints q1 each of which is formed between three unit windings P of different phases and second joints q2 each of which is formed between two unit windings p of the same phase. Those first and second joints q1 and q2 can be formed by: (1) drawing lead portions of the unit windings P from corresponding slots 31a of the stator core 31 to the same axial side of the stator core 31 as the turn portions 32c of the electric conductor segments 32; (2) deforming the lead portions of the unit windings p into respective predetermined shapes; and (3) joining corresponding ends of the lead portions of the unit windings p by welding.

Figure 4B:
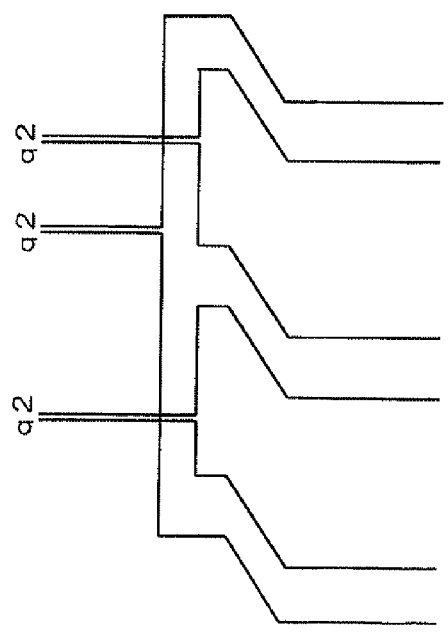
FIG. 4B is a schematic view illustrating only the second joints omitting the first joints.

However, since each of the second joints q2 is formed between only two unit windings p of the same phase as shown in FIGS. 2 and 4A-4B, it is also possible to connect each pair of the unit windings p of the same phase by other methods.

For example, as shown in FIGS. 5A-5B, each pair of the unit windings p of the same phase can be connected to each other via one connecting electric conductor segment 132 which has a substantially U shape different from that of the electric conductor segments 32. Consequently, with the use of the connecting electric conductor segments 132, it is possible to reduce the number of joining spots in the stator coil 33, simplify the task of laying out the lead portions of the unit windings p and reduce the height of coil ends of the stator coil 33. Here, the coil ends denote those parts of the stator coil 33 which are located outside of the slots 31a of the stator core 31 and protrude from corresponding axial end faces of the stator core 33.

Figure 6A:
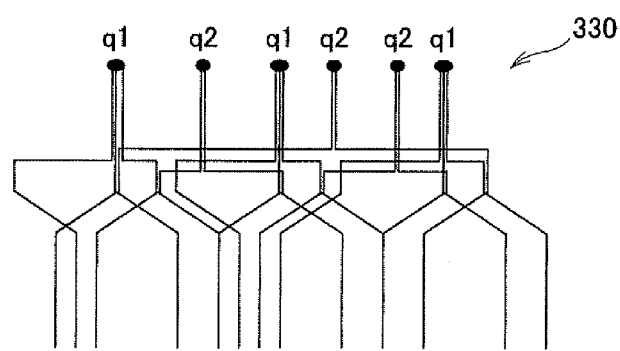
FIGS. 6A and 6B are schematic views illustrating a method of connecting all the unit windings for forming the stator coil according to another modification.
Figure 6B:
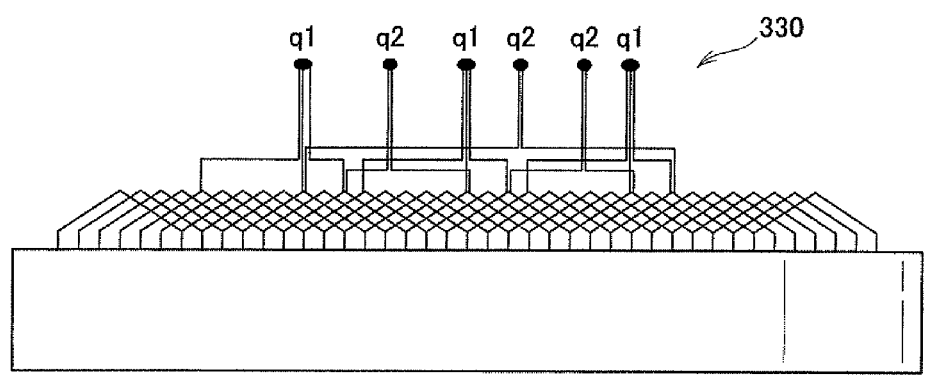

Otherwise, as shown in FIGS. 6A-6B, all the unit windings p can be connected via an assembly 330. The assembly 330 includes a plurality of connecting electric conductor segments that have end portions shaped into the same predetermined shapes as the lead portions of the unit windings P and assembled together before being mounted to the stator core 31. Further, the assembly 330 is mounted to the stator core 31 to have the connecting electric conductor segments of the assembly 330 inserted in corresponding slots 31a of the stator core 31; then, the end portions of the connecting electric conductor segments of the assembly 330 are jointed by welding to form joints therebetween, which make up the first and second joints q1 and q2 between the unit windings p. Consequently, with the use of the assembly 330, it is unnecessary to lay out the lead portions of the unit windings p after the mounting of all the electric conductor segments to the stator core 31, thus simplifying the process of joining the unit windings p to form the stator coil 33.

Figure 7:
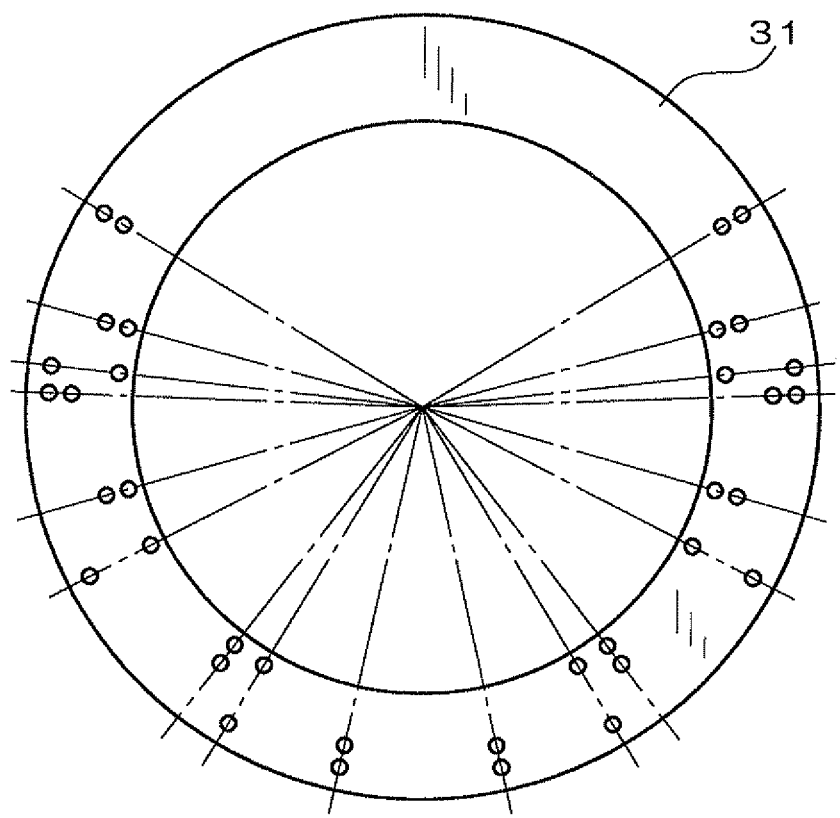
FIG. 7 is a schematic view illustrating the positions of lead portions of the unit windings according to the embodiment.

Furthermore, it is preferable that the number of the lead portions of the unit windings p which are radially aligned with each other is set to be less than the number of the in-slot portions 321 of the electric conductor segments 32 in each of the slots 31a of the stator core 31 (i.e., four in the present embodiment). More particularly, as shown in FIG. 7, in the present embodiment, the number of the lead portions of the unit windings p which are radially aligned with each other is set to be equal to 2. Consequently, it is possible to secure sufficient spaces for laying out the lead portions of the unit windings p, thereby facilitating the task of laying out the lead portions of the unit windings p. In addition, it should be noted that in FIG. 7, the positions of the lead portions of the unit windings p are designated by circles "○".

Figures 8, 9, 10:
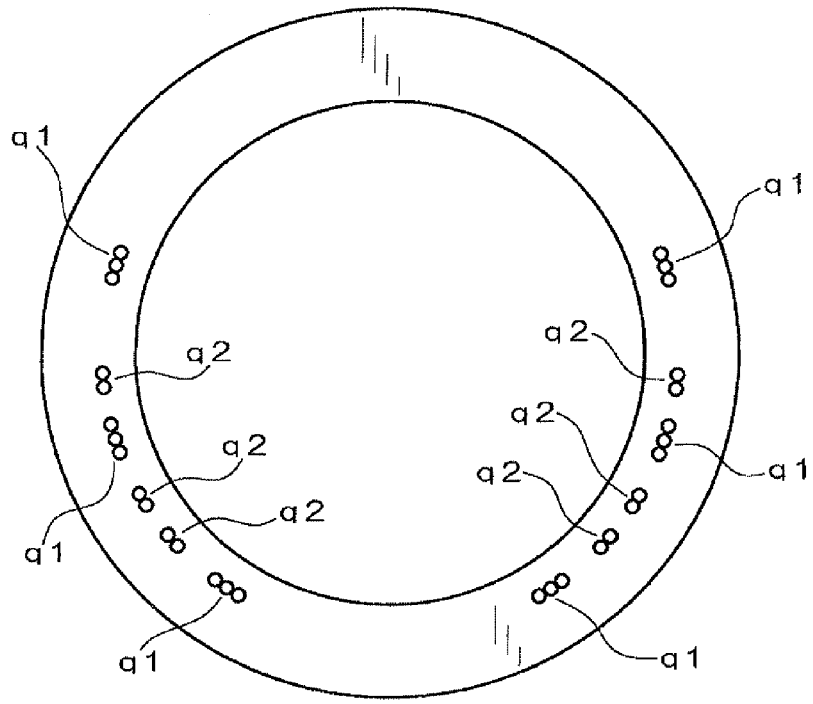
FIG. 8 is a schematic view illustrating the positions of the first and second joints formed between the unit windings according to the embodiment.
FIG. 9 is a tabular representation illustrating possible combinations of the number of turns of a Δ-connected first three-phase winding and the number of turns of a Y-connected second three-phase winding in a Δ-Y connection of the stator coil when the total number of turns of the Δ-Y connection is equal to 4.
FIG. 10 is a tabular representation illustrating possible combinations of the number of turns of the Δ-connected first three-phase winding and the number of turns of the Y-connected second three-phase winding when the total number of turns of the Δ-Y connection is equal to 8.

Moreover, in the present embodiment, as shown in FIG. 8, all the first and second joints q1 and q2 are located so as to be out of radial alignment with each other. Consequently, it is possible to secure sufficient spaces for arranging joining jigs for joining corresponding ends of the lead portions of the unit windings p. As a result, it is possible to increase the size of the joining jigs, thereby improving the durability of the joining jigs.

After having described the configuration of the alternator 1 according to the present embodiment, advantages thereof will be described hereinafter.

In the present embodiment, the alternator 1 includes the rotor 2 and the stator 3 that is disposed radially outside of the rotor 2. The stator 3 includes the hollow cylindrical stator core 31 and the stator coil 33 mounted on the stator core 31. The stator core 31 has the slots 31a that are arranged in the circumferential direction of the stator core 31 at equal intervals. The stator coil 33 is formed of the substantially U-shaped electric conductor segments 32 to include the pair of Δ-Y connections 33A and 33B that have the same configuration.

For example, the Δ-Y connection 33A is comprised of the Δ-connected first three-phase winding 34 and the Y-connected second three-phase winding 35. The first three-phase winding 34 includes the three phase windings 34U, 34V and 35W that are Δ-connected to define the three terminals of the first three-phase winding 34 therebetween. The second three-phase winding 35 includes the three phase windings 35X, 35Y and 35Z that are respectively connected to the three terminals of the first three-phase winding 34. Further, the number of turns of the first three-phase winding 34 and the number of turns of the second three-phase winding 35 are respectively set to two different odd numbers.

With the above configuration, it is possible to increase the degree of freedom in selection of the stator coil specification in comparison with the conventional configuration where both the number of turns of the Δ-connected three-phase winding and the number of turns of the Y-connected three-phase winding are set to the same even number. That is, it is possible to increase the output of the alternator 1 in a high-speed operating region and improve the efficiency of the alternator 1 by setting the number of turns of the Δ-connected first three-phase winding 34 to be greater than the number of turns of the Y-connected second three-phase winding 35. On the other hand, it is also possible to increase the output of the alternator 1 in a low-speed operating region by setting the number of turns of the first three-phase winding 34 to be less than the number of turns of the second three-phase winding 35.

For example, as shown in FIG. 9, in the case of the total number of turns of the Δ-Y connection 33A being equal to 4, with the configuration according to the present embodiment, there are two possible combinations of the number of turns of the first three-phase winding 34 and the number of turns of the second three-phase winding 35. Specifically, in one combination, the number of turns of the Δ-connected first three-phase winding 34 is equal to 1 while the number of turns of the Y-connected second three-phase winding 35 is equal to 3; thus, the number of turns of an equivalent Y connection that is equivalent to (or converted from) the Δ-Y connection 33A is approximately equal to 3.58. In the other combination, the number of turns of the first to three-phase winding 34 is equal to 3 while the number of turns of the second three-phase winding 35 is equal to 1; thus, the number of turns of the equivalent Y connection is approximately equal to 2.73.

In comparison, with the conventional configuration, there is only one possible combination of the number of turns of the first three-phase winding 34 and the number of turns of the second three-phase winding 35. That is, both the number of turns of the Δ-connected first three-phase winding 34 and the number of turns of the Y-connected second three-phase winding 35 are equal to 2.

Moreover, as shown in FIG. 10, in the case of the total number of turns of the Δ-Y connection 33A being equal to 8, with the configuration according to the present embodiment, there are four possible combinations of the number of turns of the first three-phase winding 34 and the number of turns of the second three-phase winding 35. Specifically, in the first combination, the number of turns of the Δ-connected first three-phase winding 34 is equal to 1 while the number of turns of the Y-connected second three-phase winding 35 is equal to 7; thus, the number of turns of the equivalent Y connection is approximately equal to 7.58. In the second combination, the number of turns of the first three-phase winding 34 is equal to 3 while the number of turns of the second three-phase winding 35 is equal to 5; thus, the number of turns of the equivalent Y connection is approximately equal to 6.73. In the third combination, the number of turns of the first three-phase winding 34 is equal to 5 while the number of turns of the second three-phase winding 35 is equal to 3; thus, the number of turns of the equivalent Y connection is approximately equal to 5.89. In the fourth combination, the number of turns of the first three-phase winding 34 is equal to 7 while the number of turns of the second three-phase winding 35 is equal to 1; thus, the number of turns of the equivalent Y connection is approximately equal to 5.04.

In comparison, with the conventional configuration, there is only one possible combination of the number of turns of the first three-phase winding 34 and the number of turns of the second three-phase winding 35. That is, both the number of turns of the Δ-connected first three-phase winding 34 and the number of turns of the Y-connected second three-phase winding 35 are equal to 4. In addition, even with a configuration where the number of turns of the first three-phase winding 34 and the number of turns of the second three-phase winding 35 are respectively set to two different even numbers, there are only three possible combinations of the number of turns of the first three-phase winding 34 and the number of turns of the second three-phase winding 35, i.e., (2:6), (4:4) and (6:2).

Furthermore, with the configuration according to the present embodiment, it is possible to realize the above-described different combinations of the number of turns of the first three-phase winding 34 and the number of turns of the second three-phase winding 35 with the same stator core 31 and electric to conductor segments 32. In addition, it is unnecessary to change the specification of the rectifier 5 only for the purpose of realizing the different combinations of the number of turns of the first three-phase winding 34 and the number of turns of the second three-phase winding 35.

Accordingly, with the configuration according to the present embodiment, it is possible to increase the degree of freedom in selection of the stator coil specification without increasing the cost, the number of part types or the man-hours for manufacturing the alternator 1.

While the above particular embodiment and modifications have been shown and described, it will be understood by those skilled in the art that various further modifications, changes, and improvements may be made without departing from the spirit of the present invention.

For example, in the previous embodiment, the present invention is directed to the automotive alternator 1. However, the invention can also be applied to other rotating electric machines, such as an electric motor and a motor-generator that can function both as an electric motor and as an electric generator.

In the previous embodiment, the stator coil 33 is configured to include the pair of Δ-Y connections 33A and 33B. However, the stator coil 33 may also be configured to include only one of the Δ-Y connections 33A and 33B.

In the previous embodiment, the stator coil 33 is formed of the electric conductor segments 32 that have the substantially rectangular cross-sectional shape. However, the stator coil 33 may also be formed of electric conductor segments having other cross-sectional shapes, such as a substantially elliptical cross-sectional shape.

In the previous embodiment, the stator core 31 is formed by laminating the magnetic steel sheets in the axial direction of the stator core 31. However, the stator core 31 may also be formed by laminating other conventional metal sheets than the magnetic steel sheets.

Figure 11A:
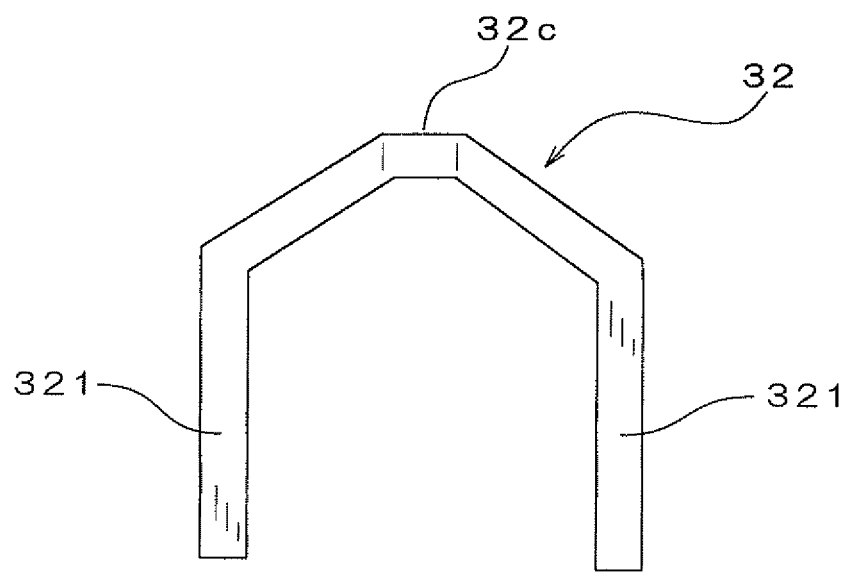
FIGS. 11A and 11B are respectively front and top views of one of the electric conductor segments forming the stator coil.
Figure 11B:
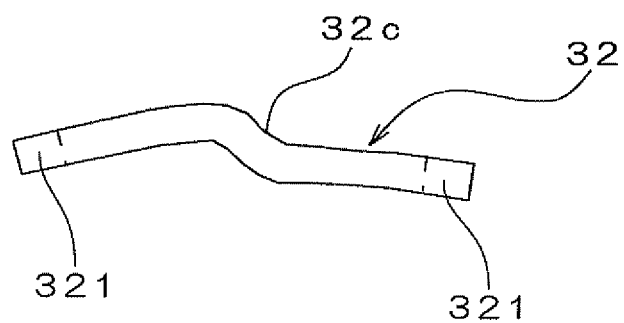

In the previous embodiment, the first and second joints q1 and q2 formed between the unit windings p are located on the same axial side of the stator core 31 as the turn portions 32c of the electric conductor segments 32. Further, referring to FIGS. 3A and 11A-11B, for each of the electric conductor segments 32, the turn portion 32c of the electric conductor segment 32 is preferably formed by radially shifting the in-slot portions 321 of the electric conductor segment 32 relative to each other without twisting the electric conductor segment 32. In addition, each of the electric conductor segments 32 is covered, except at its ends joined to other electric conductor segments 32, by an insulating coat (not shown). Consequently, with the above formation of the turn portions 32c of the electric conductor segments 32, it is possible to prevent the insulating coats covering the electric conductor segments 32 from being damaged at the turn portions 32c and reduce stresses induced the in insulating coats at the turn portions 32c. As a result, it is possible to reliably secure electrical insulation between the turn portions 32c of the electric conductor segments 32 and the first and second joints q1 and q2 formed between the unit windings p.

In addition, though not described in the previous embodiment, it is preferable to perform at least one of the following electrical insulation processes for the stator coil 33.

Figure 12:
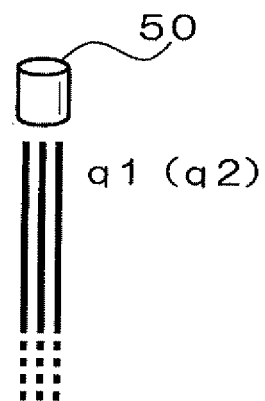
FIG. 12 is a schematic view illustrating one electrical insulation process for the stator coil.

(a) Cover each of the first and second joints q1 and q2 formed between the unit windings p with a resin cap 50, as shown in FIG. 12. Consequently, with the resin caps 50, it is possible to improve electrical insulation between the first and second joints q1 and q2.

Figure 13:
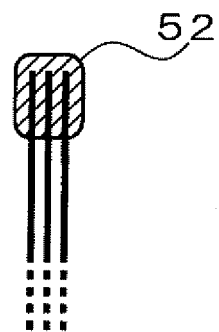
FIG. 13 is a schematic view illustrating another electrical insulation process for the stator coil.

(b) Apply a multi-layer insulation coating (or resin coating) to each of the first and second joints q1 and q2 formed between the unit windings p, forming an insulator 52 that covers the joint as shown in FIG. 13. Consequently, with the insulators 52, it is possible to improve electrical insulation between the first and second joints q1 and q2.

In addition, it is also possible to: first cover the first and second joints q1 and q2 with the respective resin covers 50 as shown in FIG. 12; and then apply the multi-layer insulation coating to cover those parts of the first and second joints q1 and q2 which are exposed from the respective resin covers 50. In contrast, it is also possible to: first apply the multi-layer insulation coating to the first and second joints q1 and q2; and then cover the first and second joints q1 and q2 with the respective resin covers 50.

(c) Cover the first and second joints q1 and q2 formed between the unit windings p with a first impregnating material, the joints formed between the corresponding end portions of the U-shaped electric conductor segments 32 with a second impregnating material, and the turn portions 32c of the electric conductor segments 32 with a third impregnating material. The first, second and third impregnating materials have different viscosities from each other.

Figure 14:
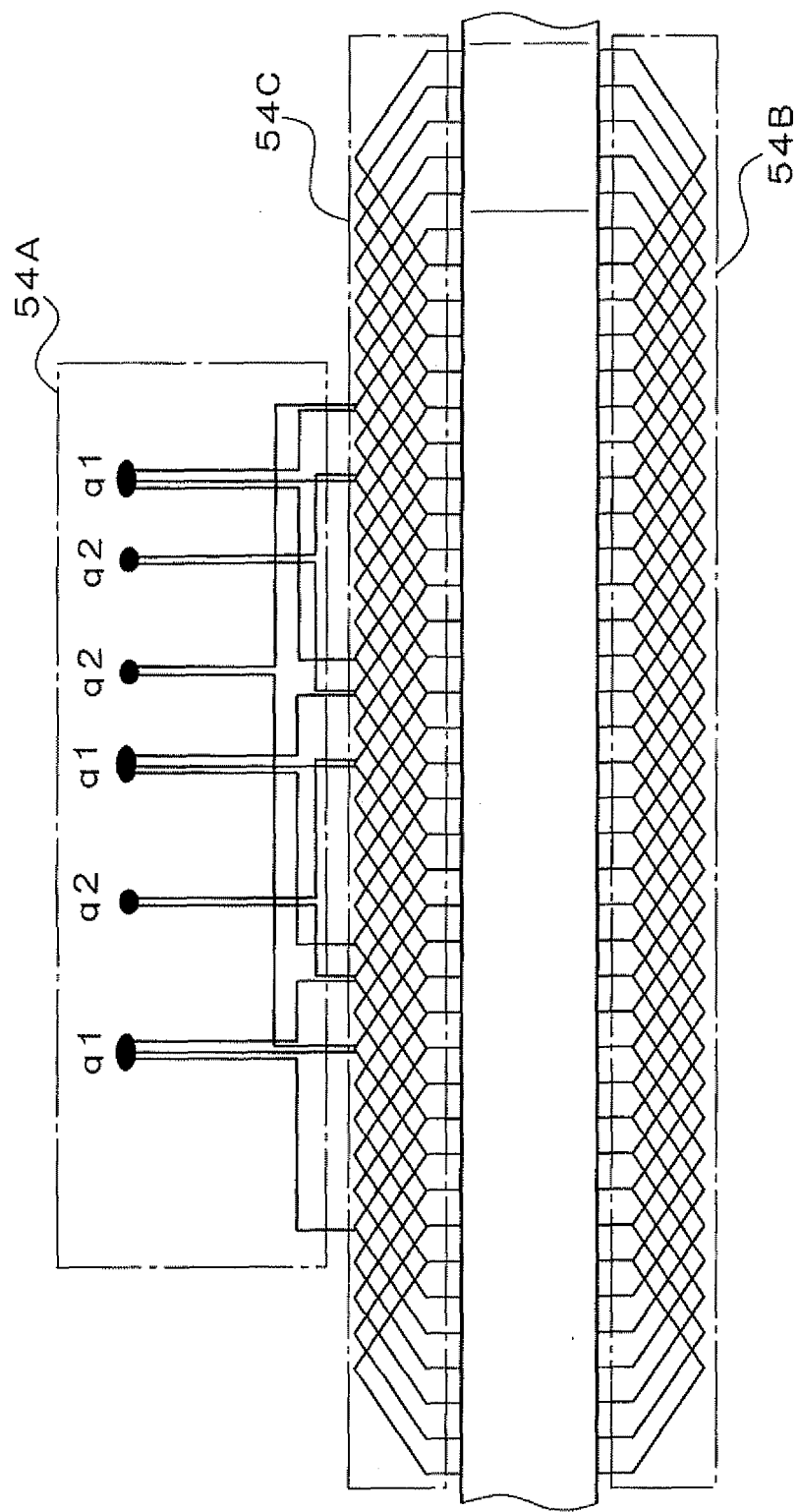
FIG. 14 is a schematic view illustrating yet another electrical insulation process for the stator coil.

That is, apply impregnation to the first, second and third regions 54A-54C shown in FIG. 14 respectively with the first, second and third impregnating materials.

In addition, the viscosities of the first to the third impregnating materials can be suitably selected according to the shapes and dimensions of the first and second joints q1 and q2 formed between the unit windings p, the joints formed between corresponding ends of the U-shaped electric conductor segments 32, and the turn portions 32c of the electric conductor segments 32. Consequently, it is possible to more reliably secure electrical insulation of the stator 3.

What is claimed is:

1. A rotating electric machine comprising:
a rotor; and
a stator including a hollow cylindrical stator core and a stator coil mounted on the stator core, the stator core having a plurality of slots that are arranged in a circumferential direction of the stator core, the stator coil being formed of a plurality of substantially U-shaped electric conductor segments to include at least one Δ-Y connection, the Δ-Y connection being comprised of a Δ-connected first three-phase winding and a Y-connected second three-phase winding, the first three-phase winding including three phase windings that are Δ-connected to define three terminals of the first three-phase winding therebetween, the second three-phase winding including three phase windings that are respectively connected to the three terminals of the first three-phase winding, wherein the number of turns of the first three-phase winding and the number of turns of the second three-phase winding are respectively set to two different odd numbers, each of the substantially U-shaped electric conductor segments forming the stator coil includes a pair of in-slot portion, a turn portion and a pair of end portions, the in-slot portions being respectively received in two different ones of the slots of the stator core, the turn portion extending on one axial side of the stator core to connect the in-slot portions of the electric conductor segment, the end portions extending on the other axial side of the stator core respectively from the in-slot portions of the electric conductor segment and being respectively joined to corresponding end portions of another two of the electric conductor segments, each of the phase windings of the first and second three-phase windings includes at least one unit winding that is formed by joining the corresponding end portions of a predetermined number of the electric conductor segments so as to extend for one turn around the stator core, and each pair of the unit windings included in the same one of the phase windings of the first and second three-phase windings are connected to each other via one connecting electric conductor segment which has a substantially U shape different from that of the electric conductor segments forming the stator coil.

2. The rotating electric machine as set forth in claim 1, wherein the first and second three-phase windings are mounted on the stator core so that each of the phase windings of the first three-phase winding is offset from a corresponding one of the phase windings of the second three-phase winding by π/6 in electrical angle.

3. The rotating electric machine as set forth in claim 1, wherein
the ratio of number of the in-slot portions between the first and second three-phase windings in the same slot of the stator core is set to be equal to the ratio of number of turns between the first and second three-phase windings.

4. The rotating electric machine as set forth in claim 1, wherein
all corresponding pairs and trios of the unit windings forming the phase windings of the first and second three-phase windings are connected via an assembly which includes a plurality of connecting electric conductor segments that are shaped and assembled together before being mounted to the stator core.

5. The rotating electric machine as set forth in claim 1, wherein
corresponding pairs and trios of the unit windings forming the phase windings of the first and second three-phase windings are joined to form joints therebeween, and
all the joints formed between the unit windings are located so as to be out of radial alignment with each other.

6. The rotating electric machine as set forth in claim 1, wherein
corresponding pairs and trios of the unit windings forming the phase windings of the first and second three-phase windings are joined to form joints therebeween, and the joints are located on the same axial side of the stator core as the turn portions of the electric conductor segments, and
for each of the electric conductor segments, the turn portion of the electric conductor segment is formed by radially shifting the in-slot portions of the electric conductor segment relative to each other without twisting the electric conductor segment.

7. The rotating electric machine as set forth in claim 1, wherein each of the electric conductor segments forming the stator coil has a substantially rectangular cross-sectional shape.

8. The rotating electric machine as set forth in claim 1, wherein the stator core is formed of magnetic steel sheets that are laminated in an axial direction of the stator core.

9. The rotating electric machine as set forth in claim 1, wherein
corresponding pairs and trios of the unit windings forming the phase windings of the first and second three-phase windings are joined to form joints therebeween, and
each of the joints formed between the unit windings is covered with a resin cap.

10. The rotating electric machine as set forth in claim 1, wherein
corresponding pairs and trios of the unit windings forming the phase windings of the first and second three-phase windings are joined to form joints therebeween, and
each of the joints formed between the unit windings is multi-layer-insulation-coated.

11. The rotating electric machine as set forth in claim 1, wherein the stator coil includes a plurality of Δ-Y connections that have the same conFiguration and are located on the stator core so as to be offset from one another by π/6 in electrical angle.

12. The rotating electric machine as set forth in claim 1, wherein the connecting electric conductor segment includes a pair of in-slot portions, a pair of inclined portions and an apex portion, the pair of in-slot portions being respectively received in two different ones of the slots of the stator core, the pair of inclined portions extending respectively from the pair of in-slot portions and being inclined from the pair of in-slot portions toward the same side in the circumferential direction of the stator core, the apex portion being located on the opposite side of the pair of inclined portions to the pair of in-slot portions and extending substantially perpendicular to the pair of in-slot portions.

* * * * *